W. W. BATCHELDER.

Lamp.

No. 659. Reissued Feb. 8, 1859.

Witnesses:

Daniel Breed.

G. Breed.

Inventor:

William W. Batchelder.

N. PETERS, Photo-Lithographer, Washington, D. C.

UNITED STATES PATENT OFFICE.

WM. W. BATCHELDER, OF NEW YORK, N. Y.

IMPROVEMENT IN LAMPS.

Specification forming part of Letters Patent No. 22,409, dated December 28, 1858; Reissue No. 659, dated February 8, 1859.

*To all whom it may concern:*

Be it known that I, WILLIAM W. BATCHELDER, of New York, in the county of New York and State of New York, have invented a new and useful Improvement in Lamps; and I do hereby declare that the following is a full and exact description thereof, reference being had to the accompanying drawings and to the letters of reference marked thereon.

My improvement in lamps is designed more particularly for use in burning kerosene or coal oil, but it is also adapted for burning other oils.

The object of my invention is to secure the complete combustion of the oil without employing the common glass chimney, and also to obtain the greatest amount of illumination from the combination of a given amount of oil.

My invention consists in the use of tapers or wick-tubes, placed below and on both sides of a flat wick-tube or main illuminating-burner, in combination with a suitable cap, thus supplying sufficient oxygen completely to burn the oil without a chimney and also without raising the cap so as to obscure a large portion of the main flame.

Figure 3:
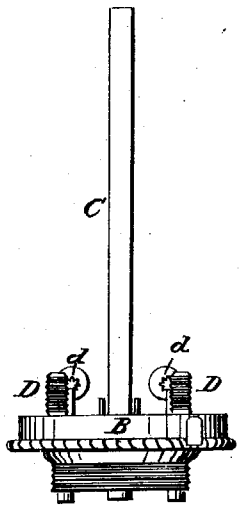
Figure 2:
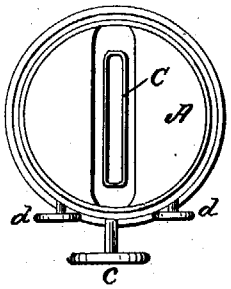
Figure 1:
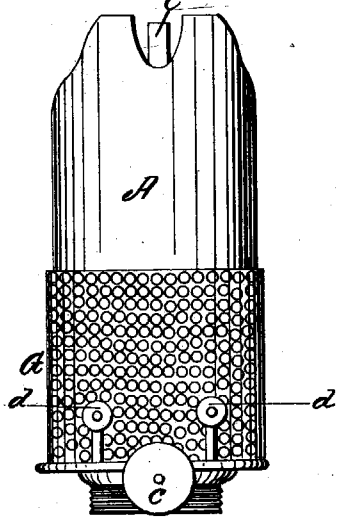

In the accompanying drawings, Figure 1 is an elevation of a lamp cap with my improvement attached. Fig. 2 is a top view of the same. Fig. 3 is an elevation of a part of the same cap with the outer cap removed to show the wick-tubes.

The lower part, B, of the cap is screwed upon the lamp in the usual manner. Above this is a reticulated ring, G, for the purpose of admitting air under the wick-cap A, which is slotted at the top to fit a flat wick, as seen in Fig. 2. The ring G is removable from B and A for the purpose of cleaning, and both the ring G and the wick-cap A have the usual vertical adjustability. By the contraction of the cap A near the top the air is concentrated upon the flame.

In addition to the reticulated or perforated ring G a supplementary ring may be employed to assist in preventing a rush of air through the cap A. These rings and the cap A may be of any suitable form, such as are in common use for kerosene-lamps.

Into the lower part, B, of the cap are inserted the usual wick-tube, C, Fig. 3, and likewise two very small and short wick-tubes, D. These tubes are furnished with wick-adjusters *c* and *d*. By this arrangement the lamp when trimmed and lighted has a stronger draft on account of the tapers in the short tubes D; consequently the cap A may be lowered upon the main wick-tube C, as seen in Fig. 1, so that the illuminating-flame is almost entirely above the cap. In other lamps, where the draft is to be produced by the wick-cap A alone, it is necessary to elevate this cap so as to give a considerable volume of heated air in the upper part of the cap in order to create sufficient draft, but this elevation of the cap obscures more of the flame and lessens the illuminating power of the lamp. On the contrary, by the use of the small-draft lights, I find that the top of the cap A may be adjusted about half an inch lower upon the illuminating-burner without causing the lamp to smoke. Consequently I can secure a greater illuminating power from a given amount of oil. I can also dispense altogether with glass chimneys, which are liable to crack, difficult to keep clean, and otherwise objectionable; nor do I render my lamp liable to the serious objections attendant upon other lamps having no chimneys.

My tapers or tubes D are placed opposite the flat sides of the wick-tube C, and so remote from the latter as to be incapable of vaporizing the oil passing to the main or illuminating flame. The oil from tube C is burned "cold," as it is called, and I thus prevent the escape of a large amount of oil-vapor which is emitted by many other lamps, especially while they are being lighted.

I am aware that secondary flames or tapers have been used for the purpose of vaporizing oil in lamps, and also for preventing explosions from vapor within the lamp. I also know that the main wick has been crowned by a tall gauze chimney, surrounded by a high cap, so that the oil is partially burned as it escapes from the wick while another portion of the oil is vaporized and rises to the top of said chimney and cap, where the illuminating-flame is produced. In all of these cases the sole advantages are the vaporization of the oil and the prevention of explosion from vapor. Incidentally, the draft in these lamps may be increased, but of necessity from their arrangement the smoke and other products of combustion from the lower flame are usually driven upon the higher or illuminating flame, materially lessening its brilliancy. Thus the peculiar advantages of my invention are not attained.

By the use of a taper on each side of my main wick, and by placing these tapers at a considerable distance from the wick-tube C, the great volume of draft rises around and near said wick-tube C, so as to supply the main flame with pure air in sufficient quantity to produce complete combustion. At the same time the ascending current of air wafts the slight products of combustion from the tapers against the sides of the cap, said products escaping without coming in contact with the upper flame or in the least diminishing its brightness. To this end, I place the tapers as far from the burner C as the size of the cap will permit, thus giving a free circulation of air between them and preventing the wick-tube C from being heated by the tapers.

Having thus fully described my invention, what I claim, and desire to secure by Letters Patent of the United States, is—

The arrangement of small tapers or wick-tubes below and on both sides of the main or illuminating burner, in combination with a suitable cap, for the purpose of producing a more complete combustion, substantially as set forth.

WM. W. BATCHELDER.

Witnesses:
JOHN F. TROW,
GEO. W. TROW.